(12) United States Patent
Ngan

(10) Patent No.: US 7,751,778 B1
(45) Date of Patent: Jul. 6, 2010

(54) METHOD AND SYSTEM FOR INCREASING DATA TRANSMISSION RATES

(75) Inventor: John C. W. Ngan, Shawnee, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1345 days.

(21) Appl. No.: 11/216,248

(22) Filed: Aug. 30, 2005

(51) Int. Cl.
*H04Q 7/20* (2006.01)
(52) U.S. Cl. ............... 455/11.1; 455/7; 455/9; 455/466; 455/414.1; 455/517; 370/315; 370/310; 370/316; 370/322
(58) Field of Classification Search ........ 455/11.1, 455/7, 414.1–414.4, 13.4, 24, 466, 9, 16, 455/500, 517, 422.1, 403, 426.1, 426.2, 456.1–457; 370/315, 316, 310, 322, 328; 375/211

See application file for complete search history.

(56) References Cited

U.S. PATENT DOCUMENTS

| 6,665,521 B1 * | 12/2003 | Gorday et al. ........... 455/67.11 |
| 2002/0028655 A1 * | 3/2002 | Rosener et al. ............... 455/16 |
| 2003/0157943 A1 * | 8/2003 | Sabat, Jr. ..................... 455/456 |

* cited by examiner

*Primary Examiner*—Keith T Ferguson

(57) ABSTRACT

Methods and systems are disclosed for improving data transmission rates in a wireless communication system. An example method may be implemented in a wireless communication system including a plurality of base stations defining a plurality of wireless coverage areas in which a mobile station can engage in radio frequency (RF) communication with the base stations where the method includes determining a location of the mobile station. Based on the determined location of the mobile station, the method further includes determining whether activating an inactive signal repeater would increase a rate at which data is able to be communicated from the base stations to the mobile station. In the event that that it is determined that activating the signal repeater would increase the rate at which data is able to be communicated, the method still further includes activating the signal repeater.

21 Claims, 4 Drawing Sheets

METHOD AND SYSTEM FOR INCREASING DATA TRANSMISSION RATES

BACKGROUND

1. Field

This disclosure relates to wireless communications and, more particularly, to improving data transmission rates.

2. Description of Related Art

In a wireless communication system operating according to the Telecommunication Industry Association IS-856 standard (commonly referred to as Evolution-Data Only, or "EV-DO") or the like, the data rate received by a mobile station (or "access terminal") on the forward link is proportional to the signal-to-noise ratio (C/I) of the pilot signal received by the mobile station on the forward link. In particular, IS-856 defines a set of correlations between C/I ratios and data rates, such that, the higher the C/I ratio, the higher the data rate, and the lower the C/I ratio, the lower the data rate. Further, IS-856 dictates that a mobile station should measure a C/I ratio associated with a base station communication sector that is serving the mobile station and then request the base station to transmit on the forward link at the data rate corresponding to that measured C/I. (Generally, the base station will then transmit at that requested data rate, although the actual data rate may vary somewhat, depending on factors such as actual traffic load at the time.) The IS-856 standard is incorporated by reference herein in its entirety.

Additionally, under IS-856, each sector has an allocated power level (i.e., its power amplifier (PA) is set to output at a particular sector power level), and the sector transmits its pilot signal at a certain percentage (typically a high percentage) of the sector's total allocated power. Thus, the pilot signal in each sector is largely a fixed power level, based on the power generally allocated to the sector. Since the data rate on the IS-856 forward link is proportional to the signal-to-noise ratio, it follows that a mobile station will operate at (or at least request operation at) a lower data rate when more noise is present in the sector.

One factor that adds to the noise in an IS-856 sector is "pilot pollution", e.g., interference from pilot signals of other sectors. This phenomenon typically occurs at border areas, where sectors overlap. Under IS-856, a mobile station operates on just one sector at a time, usually the sector having the highest C/I detected by the mobile station. If the mobile station detects other pilots at the same time and interference results, such interference will increase the denominator, I, of the serving sector's C/I ratio. This will result in a decrease in the C/I ratio and a corresponding decrease in the forward link data rate (or at least the requested forward link data rate).

Another factor that reduces the C/I ratio associated with a serving sector is the distance the mobile station is from the serving sector. As the mobile travels away from a serving sector, the pilot signal (and data signals) will become more attenuated (in addition to interference from pilot signals from neighboring cell sectors). This attenuation will reduce the numerator, C, of the serving sector's C/I ratio and, thus, also result in a reduction in the requested forward link data rate.

Based on the foregoing, alternative approaches for communicating forward link data to improve overall data transmission rates are desirable.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are given by way of example and meant to be illustrative, not limiting in scope. In various embodiments, one or more of the above-described problems have been reduced or eliminated, while other embodiments are directed to other improvements.

An example method for transmitting data to a mobile station may be implemented in a wireless communication system that includes a plurality of base stations that define a corresponding plurality of wireless coverage areas in which a mobile station can engage in radio frequency (RF) communication with the base stations. The example method includes determining a location of the mobile station. Any number of techniques may be used to determine the location of the mobile station. For example, the location of the mobile station may be determined using a global positioning system. Alternatively, other techniques such as triangulation may be used to determine the location of the mobile station. Such location techniques are described in U.S. Pat. No. 6,490,456, entitled "Locating a Mobile Unit in a Wireless Time Division Multiple Access System" and U.S. Pat. No. 6,819,286, entitled "Location Determination for Mobile Units", both of which are incorporated by reference herein in their entirety. Location determination is also described in TIA standard J-STD-036-B-2005, entitled "Enhanced Wireless 9-1-1 Phase 2", which relates to location determination of mobile stations when placing an emergency call to 9-1-1 services. TIA standard J-STD-036-B-2005 is incorporated by reference herein in its entirety.

The example method further includes, based on the determined location of the mobile station, determining whether activating an inactive signal repeater would increase a rate at which data is able to be communicated to the mobile station from a serving base station of the plurality of base stations. For instance, if a mobile station is traveling along a path between a first base station and a second base station, the rate at which data can be delivered from the first base station will decrease as the mobile station moves away form the first base station and toward the second base station. Due to the relationship of data rates with relative location between active base station (and/or repeater sites), activating a repeater that is located approximately midway between the first base station and second base station will provide for increased data rates (e.g., for IS-856 data communication) where the mobile station is located in a region between approximately one-third the distance and two-thirds the distance from the first base station to the second base station. When it is determined that the mobile station is within this region, the first base station signals the repeater (which is initially inactive, e.g., not transmitting wireless signals) to activate its transceivers and "repeat" data communication signals being transmitted from the first base station. Likewise, when the mobile station moves outside that region, the base station would signal the repeater to deactivate its transceiver in order to achieve a better data transmission rate.

An example system for improving data communication rates includes a mobile station, a first base station and a second base station. The first and second base stations provide wireless data communication services to the mobile station. In the example system, the first base station is initially serving a data call for the mobile station. The system further includes a signal repeater that is controllable by the first base station. The signal repeater may be initially active or inactive, however in this example it is assumed that the repeater is initially disabled. For the example system the mobile station, the first base station, the second base station and the signal repeater contain service logic that, when executed, collectively provides for implementing the method described above.

Alternatively, other methods, as described herein may be implemented in such a wireless communication system. For example, the repeater may be initially activated and the system include service logic that determines that deactivating the repeater would improve the data rate for forward link communications (e.g., in conjunction with handing off a data call to another serving sector). In response to this determination, for this method, a serving base station signals the repeater to deactivate its transceivers and stop repeating wireless signals. Depending on the particular situation, the mobile station, in conjunction with the base stations of the system, may execute a soft handoff, such as a handoff in accordance with IS-856.

BRIEF DESCRIPTION OF THE DRAWINGS

Example embodiments are illustrated in referenced figures of the drawings. It is intended that the embodiments and figures disclosed herein are to be considered illustrative rather than restrictive.

DETAILED DESCRIPTION

1. Example Network Architecture a. Cellular Wireless Communications

Figure 1:
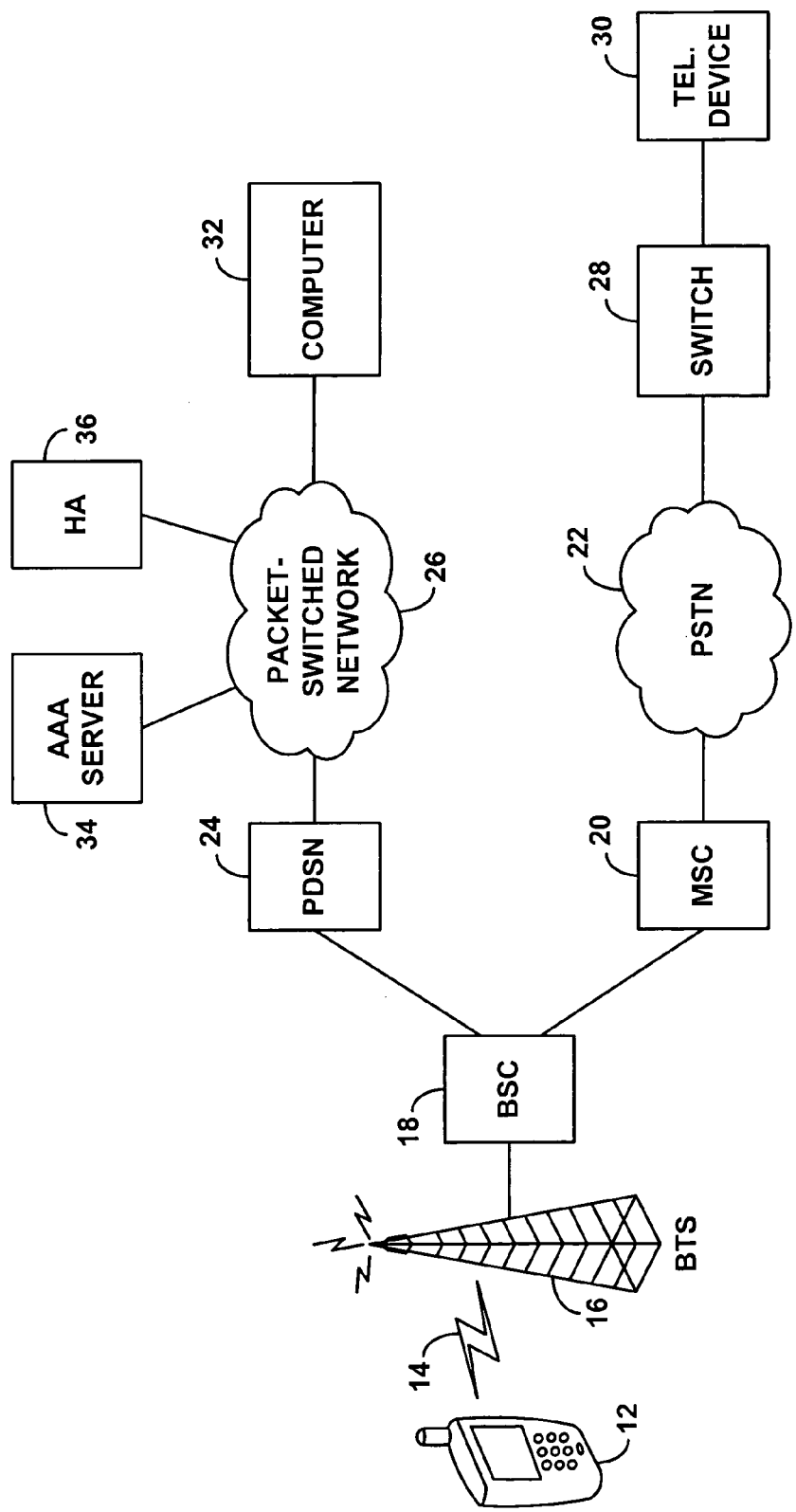
FIG. 1 is a block diagram of a wireless communication system.

FIG. 1 depicts an example cellular wireless communication system adapted to provide wireless communication service for a mobile station 12. The mobile station 12 communicates over an air interface 14 with a base transceiver station (BTS) 16, which is then coupled or integrated with a base station controller (BSC) 18 (or "radio network controller" (RNC)). The BSC 18 is then coupled (i) with a mobile switching center (MSC) 20 that provides connectivity with a public switched telephone network (PSTN) 22 and (ii) with a packet data serving node (PDSN) 24 that provides connectivity with a packet-switched network 26, such as the Internet and/or a wireless carrier's private core packet-network. Sitting as another node on the PSTN 22 is a remote switch 28 that provides connectivity with a remote telephone device 30. And sitting as nodes on the packet-switched network 26 are a remote computer 32, an authentication, authorization, and accounting (AAA) server 34, and a mobile-IP home agent (HA) 36.

With this arrangement, depending on how the mobile station 12 is equipped, the mobile station 12 may be able to engage in a telephone call with the remote telephone device 30, and/or the mobile station 12 may be able to engage in packet-data communication (e.g., IP communication) with the remote computer 32, which may be a World Wide Web server, for example.

To place a telephone call to the remote telephone device 30, for instance, the mobile station 12 sends a call origination signal over an air interface access channel to the BTS 16, which is routed to the MSC 20 via the BSC 18. The MSC 20 then directs the BSC 18 to assign an air interface traffic channel for use by the mobile station 12 and may further set up the call (via the PSTN 22) to the remote switch 28 and, in turn, to the remote telephone device 30. Similarly, when the MSC 20 receives a call to the mobile station 12 from the remote telephone device 30, the MSC 20 pages the mobile station 12 over an air interface paging channel and, when the mobile station 12 answers (e.g., a user of the mobile station 12 accepts the call), a call between the remote telephone device 30 and the mobile station 12 is connected over the air interface 14.

To engage in packet-data communication with the remote computer 32, the mobile 12 station may send a packet-data origination request (e.g., a UATI (Universal Access Terminal Identifier) request and a connection request) over the air interface 14 to the BSC 18. In this example, the BSC 18 then signals the PDSN 24 to communicate the origination request. Depending on the particular network being accessed, the BSC 18 and/or the PDSN 24 may then communicate with the AAA server 34 in order to authenticate the mobile station 12 (e.g., to determine if the mobile device 12 is authorized to access the particular network). Once such authentication (if needed in a particular network) is complete, the PDSN 24 negotiates with the mobile station 12 to establish a data communication link, such as a point-to-point protocol (PPP) session, for instance. Such negotiation also occurs in networks where authentication (e.g., using the AAA server 34) is not performed.

Further, in this example, the PDSN 20 sends a foreign agent challenge message to the mobile station 12, and the mobile station 12 responds with a mobile-IP registration request (MIP RRQ), which the PDSN 20 then forwards to the HA 28. The HA 28 then assigns an IP address for the mobile station 12 to use, and the PDSN 20 communicates that IP address, after receiving it from the HA 28, via the packet-switched network 26 (e.g., via a communication tunnel) to the mobile station 12 via the BSC 18. Once the mobile station 12 receives the IP address, the mobile station 12 may then communicate with the remote computer 32 in substantially the same manner as any other IP capable device would.

Figure 2:
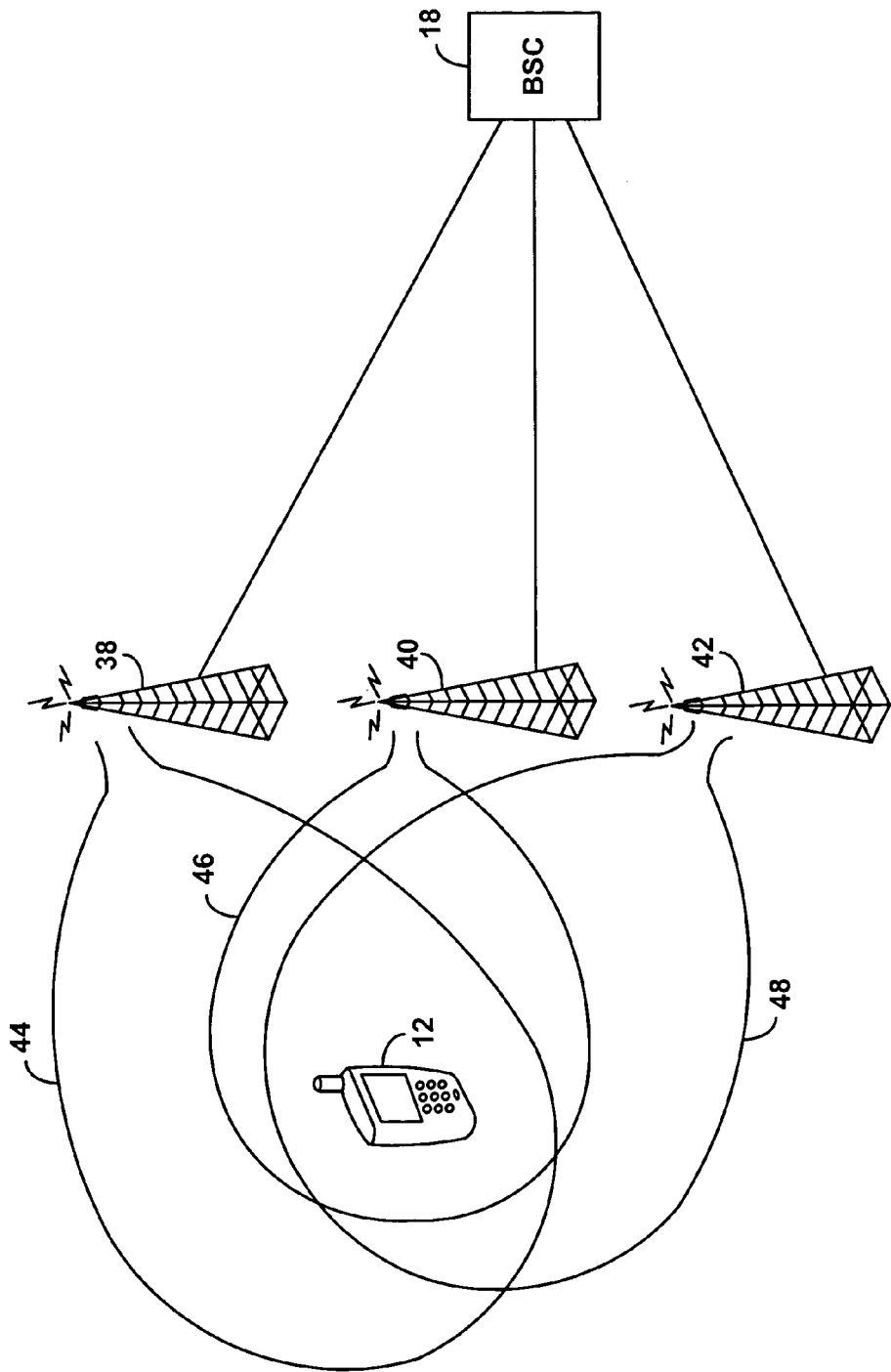
FIG. 2 is a block diagram depicting multiple representative base transceiver stations and sectors covering a service area.

In practice, the BSC 18 may serve multiple BTSs. In such a situation, each BTS transmits radio frequency (RF) signals so as to define a cell cite and a plurality of cell sectors within the cell cite. FIG. 2 illustrates a portion of such an arrangement. As shown in FIG. 2, the BSC 18 is coupled with three BTSs 38, 40, 42, each of which transmits RF signals to define respective sectors (or other wireless coverage area) 44, 46, 48, and the mobile station 12 is shown sitting at a point of overlap of the three sectors. In practice, each BTS typically defines more than one sector. However, for the purpose of this discussion, only one sector from each BTS is shown here for simplicity. With this arrangement, the mobile station 12 could theoretically operate in any of the sectors 44, 46, 48. In practice, the mobile station 12 communicates on packet network 22 via (i) its serving BTS sector (e.g., the sector that has the strongest pilot signal at the mobile station 12), (ii) the BSC 18 and (iii) the PDSN 20.

b. Legacy CDMA Communications

With reference again to FIG. 1, in a conventional or "legacy" Code Division Multiple Access ("CDMA") wireless network compliant with the well known IS-2000 standard, each cell (e.g., as defined by the BTS 16) employs one or more carrier frequencies, typically 1.25 MHz each, and each sector is distinguished from adjacent sectors by a pseudo-random number offset ("PN offset"). Further, each sector can concurrently communicate on multiple different channels, where the channels are distinguished by "Walsh codes". When the mobile station 12 operates in a given sector of the BTS 16, communications between the mobile station 12 and the BTS 16 are carried on a given frequency and are encoded using (i) the sector's PN offset and (ii) a given Walsh code.

Air interface communications (e.g., such as over the air interface 14) are divided into forward link communications, which are those passing from the BTS 16/BCS 18 to the mobile station 18, and reverse link communications, which are those passing from the mobile station 18 to the BTS 16/BCS 18. In an IS-2000 system, both forward link and reverse link communications in a given sector are encoded using (i) the sector's PN offset and (ii) a given Walsh code, as was indicated above. For the forward link, certain Walsh codes are reserved for use to define control channels, including a pilot channel, a sync channel, and one or more paging channels, and the remainder can be assigned dynamically for use as data traffic channels, i.e., to carry user data communication traffic. Similarly, on the reverse link, one or more Walsh codes may be reserved for use as access channels, while the remaining Walsh codes are assigned dynamically for use as data traffic channels.

In accordance with IS-2000, the mobile station 12 can communicate with a number of "active" sectors at a time. Depending on the system, the number of active sectors (currently) may range between three and six. In such systems, the mobile station 12 receives substantially the same signal from each of the active sectors and, on a frame-by-frame basis, selects the best signal to use (e.g., the signal with the fewest number of errors).

The mobile station 12 maintains (e.g., in an onboard memory device) a list of its "active" sectors, as well as a list of "candidate" sectors (typically up to six). The candidate sectors are sectors that not in the active set but that have sufficient signal strength (e.g., pilot signal strength) that the mobile station 12 could demodulate signals from those sectors, if needed. Further, the mobile station 12 maintains a list of "neighbor" sectors, which are those sectors not in the active set or the candidate set but are in close vicinity to the mobile station 12. All other possible sectors are members of a "remaining" set.

To facilitate a determination of which sectors should be in the mobile station 12's "active" set for a given system, all base stations in the system continuously emit a pilot channel signal in each of their respective sectors. The pilot channel signals are typically transmitted at a transmission power levels that are higher than other forward link signals for each respective sector. The mobile station 12 then constantly measures the energy of each pilot that it receives and computes a "pilot strength" as the ratio, $E_c/I_o$, of that pilot energy to the total detected energy. The mobile station 12 then notifies a primary base station (e.g., a base station currently serving the mobile station) when the pilot strength for a particular pilot signal goes above or below designated thresholds. The primary base station, in turn, provides the mobile station 12 with an updated list of active pilots (sectors).

c. High Rate Packet-Data Communications

Under IS-2000, the highest rate of packet-data communications theoretically available on a fundamental traffic channel for forward link communications is 9.6 kbps. In order to provide higher rate packet-data service to support higher bandwidth applications, the industry has introduced a new "high rate packet data (HRPD) system," which is defined by industry standard IS-856.

IS-856 takes advantage of the asymmetric characteristics of most IP traffic, in which the forward link (from the carrier network to the mobile station) typically carries a heavier load than the reverse link (from the mobile station to the carrier network). Specifically, in accordance with IS-856, the forward link uses time division multiplexing (TDM), where substantially all transmission power in a particular sector is used for transmitting data to a given user during time slots associated with the given user. Further in accordance with IS-856, reverse link is accomplish substantially in accordance with the traditional IS-2000 code division multiplexing (CDM) format, with the addition of a "data rate control" (DRC) channel that is used to indicate a "supportable" data rate based on C/I ratios (signal to noise) computed by the mobile station and a corresponding "best" serving sector (the sector with the highest C/I ratio) for the forward link. The end result is that a mobile station operating under IS-856 can, in theory, receive packet-data at a rate of at least 38.4 kbps and up to 2.4 Mbps, which equates to data rates of at least four times the maximum data rate under IS-2000.

The IS-856 forward link is divided into time slots of length 2048 chips, and each time slot is further time division multiplexed to carry various channels, including a pilot channel, a Medium Access Control (MAC) channel, and, if any data traffic (e.g., data traffic associated with data calls) exists, a forward traffic channel and a "control" channel. As in IS-2000, each sector in IS-856 is defined by a PN offset, and the pilot channel repeatedly communicates the sector's PN offset as part of the pilot signal. Also as in IS-2000, a mobile station operating under IS-856 monitors the pilot signal emitted by various sectors as a basis for facilitating active set management (e.g., to coordinate handoff from one sector to another).

Data communication in accordance with IS-856 includes a "virtual soft handoff" concept, in which a mobile station communicates with the network on just a "best" sector of its active set at any given time. As in IS-2000, the mobile station monitors the signal strength of pilot signals emitted by various sectors, and the mobile station similarly uses threshold handoff parameters as a basis to trigger the addition of a sector to the mobile station's candidate set. More particularly, under IS-856, a mobile station monitors the signal strength of all pilot signals that it can detect and computes for each sector a signal-to-noise ratio, C/I, as the ratio of (i) C=pilot strength of the sector to (ii) I=total signal level of all detected pilots. Further as in IS-2000, the mobile station then sends a revised candidate set to the network, and the network decides whether to revise the mobile station's active set. If the network decides to update the mobile station's active set, the network sends a message to the mobile station and further instructs each sector to communicate with the mobile station.

Unlike IS-2000, in which forward traffic information is routed to all sectors in the mobile station's active set, forward traffic under IS-856 is routed to only a "best" sector that the mobile station selects from its active set, typically the sector that has the strongest pilot signal strength (or, more particularly, the highest signal to noise ratio (C/I)) detected by the mobile station. In practice, the mobile station monitors the pilot signals of the sectors in its active set, and includes in its DRC channel (on the reverse link) an indication (e.g., the PN offset) of the selected serving sector. Generally, that selected serving sector will then serve the mobile station with forward link packets. Thus, a mobile station may quickly hand off from one IS-856 serving sector to another by simply instructing the base station which sector it intends to communicate with.

The pilot signal of a selected IS-856 sector is used as a basis to estimate channel conditions and to facilitate forward link data rate control. For instance, as was noted above, IS-856 defines a mapping between values of C/I and forward link data rates. Based on the C/I value that a mobile station computes for its selected sector, the mobile station will use the defined IS-856 mapping to select a particular data rate associated with that C/I value. And the mobile station will communicate, in its DRC channel, a request to receive forward link communications at that data rate. According to IS-856, the higher the C/I value, the higher the requested data rate and, correspondingly, the lower the C/I value, the lower the requested data rate.

Upon receipt of the requested data rate from the mobile station, the base station (BTS and/or BSC) will decide whether or not to grant the mobile station's requested forward link data rate (e.g., provide forward link data communications at the requested rate). For instance, the base station will apply a scheduling algorithm to determine which requests to grant and which requests to deny. Such scheduling algorithms are vendor/application specific and can, therefore, take any number of forms. If the base station decides to grant the request, the base station will then seek to deliver data to the mobile station at the requested rate.

d. Hybrid IS-2000/IS-856 Systems

Given the installed base of legacy IS-2000 systems, IS-856 was designed to be backwards compatible and to facilitate "hybrid" operation. A "hybrid access terminal," in this particular scenario, is defined as a mobile station that can operate on both IS-2000 and IS-856 networks. (A hybrid terminal may more generally be any terminal that can operate on at least two air interface protocols.) A typical hybrid terminal, for instance, may be capable of receiving voice, short message service (SMS) messages, and dedicated channel data services on IS-2000 networks, as well as engaging in high-speed packet data service on IS-856 networks.

In a hybrid system, IS-2000 and IS-856 coverage are provided on different carrier frequencies, each of which is 1.25 MHz in bandwidth for consistency with legacy operation. Further, most IS-856 systems are provided as overlays on existing IS-2000 systems, such that a given base station provides either IS-2000 coverage or both IS-2000 and IS-856 coverage. For an IS-2000 sector, the base station may have just an IS-2000 circuit card. For a hybrid IS-2000/IS-856 sector, on the other hand, the base station may have both an IS-2000 circuit card to facilitate IS-2000 operation and an IS-856 circuit card to facilitate IS-856 operation.

2. IS-856 Data Rate Dependence on Mobile Station Location

Figure 3:
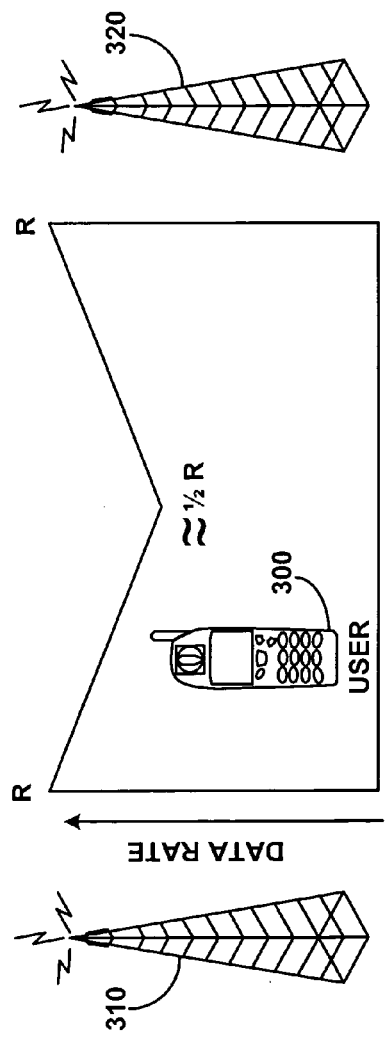
FIG. 3 is a block diagram illustrating the relationship of data transmission rate to distance between two base transceiver station (BTS) sites.

FIG. 3 is a diagram that illustrates, generally, the relationship between forward link data rates for a mobile station that is traveling between two EV-DO base station sites and the location of the mobile station with respect to those two base station sites. While the embodiments described herein are generally described in the context of EV-DO communication systems (e.g., systems in accordance with IS-856), it will be appreciated that these embodiments may be easily implemented in other types of systems, such as other time-division-multiplex systems or any number of other types of systems, such as frequency-division and code-division based systems.

In FIG. 3, a mobile station 300 is illustrated that may be served for wireless communications by either a first base station 310 or a second base station 320. However, for purposes of this illustration, it will be assumed that the mobile station 300 is initially being served by the base station 310. Of course, additional base stations may be included along with those shown in FIG. 3 and the principles and embodiments described herein are, of course, applicable in systems including any number of base station sites.

As shown in FIG. 3, the base station 310 is located a distance 'D' from the base station 320. When the mobile station 300 is located next to, or in relatively close proximity to the serving base station 310, the forward link data rate (e.g., for TDM based communications in accordance with IS-856) will be at a peak value "R" (e.g., in accordance with IS-856 mapping). As is shown in FIG. 3, as the mobile station 300 begins to move away from the serving base station 310, the data rate linearly decreases. This decrease in data rate is a result of the factors discussed above (e.g., pilot signal interference from the base station 320 and signal attenuation of the radio frequency signals from the base station 310). The forward link data rate reaches a low point of approximately R/2 when the mobile station is located around one-half of the distance "D" between the base station 310 and the base station 320 (e.g., at approximately "D/2").

In current implementations, a data call for the mobile station 300 that is being served by the base station 310 would typically be handed off (e.g., using a soft-handoff as described above) from the base station 310 to the base station 320 around the time the mobile station 300 passes this midway point ("D/2"). For a system implemented in accordance with IS-856, this handoff would occur as a result of the mobile station 300 determining that a C/I ratio associated with the base station 320 is higher than the C/I ratio associated with the base station 310 that is currently serving the call. The mobile station 300 would then signal the network (e.g., via the base station 310) that it now intends to communicate with the base station 320 and a soft-handoff of the data call from the base station 310 to the base station 320 would occur.

It will be appreciated that for wireless communication systems that transmit forward link data at substantially full power (e.g., systems in accordance with IS-856), the exact distance "D" between the base stations 310, 320 will not significantly affect the relationship illustrated in FIG. 3 as long as the base stations 310, 320 have sufficient transmission power to provide wireless coverage over the distance "D" between the base stations 310, 320. For instance, the low point for the data rate will be approximately one-half the peak data rate "R" (the data rate where the mobile station is in close proximity to a serving base station) or "R/2" as shown in FIG. 3. Further, the low point for the data rate "R/2" will occur at approximately one-half the distance "D/2" between neighboring base station sites. This relationship between data rate and relative location between neighboring base stations is due to pilot interference and the fact that the base stations communicate data (and control signals, including pilots signals) at substantially full transmission power for each sector of a base station.

Figure 4:
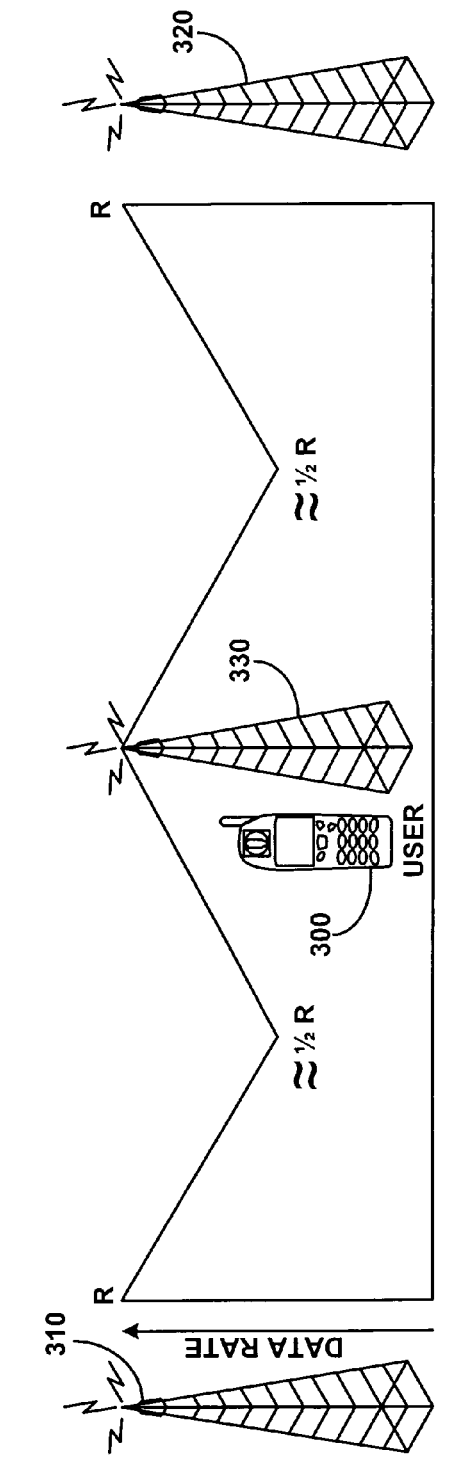
FIG. 4 is a block diagram illustrating the relationship of data transmission rate to distance between two BTS sites with an active repeater located midway between the sites.

Referring to FIG. 4 the foregoing concept is illustrated in diagram form. FIG. 4 is similar to FIG. 3 but includes a third base station 330 that is located approximately midway between the base station 310 and the base station 320. It will be appreciated that the base station 330 may operate as a full featured base station or, alternatively, may operate as a wireless signal repeater that receives and retransmits radio frequency signals from the base stations 310, 320. As used herein, the term "signal repeater" or "repeater" is to be broadly construed to mean a device that receives wireless signals and then retransmits those received signals, typically after amplification of the signals. Within such definition are base stations, stand-alone repeaters, among any number of other such devices. An example of one such repeater is described in U.S. Pat. No. 6,934,511, entitled "Integrated Repeater", which is incorporated by reference herein in its entirety. Apparatus, such as described in U.S. Pat. No. 6,934,511 may be included in any number of devices, such as full featured base stations or separately as a device for "repeating" wireless signals.

As shown in FIG. 4, the rate at which the mobile station 300 requests/receives forward link data decreases from a high value of "R" to a low value of approximately one-half of "R" midway between the base station 310 and the base station (repeater) 330. If the base station 330 is a full featured base station, a data call associated with the mobile station 300 would normally be handed off from the base station 310 to the base station 330 around the midway point between the base stations 310, 330, as has been previously described. However, if the base station 330 is a wireless repeater, such a data call may alternatively continue to be served by the base station 310 or be handed off to the base station 320 (which may also have its wireless signals repeated by the base station 330). In any of these cases, the forward link data rate increases as the mobile station 300 moves towards the base station 330. When the mobile station 300 moves into close proximity with the base station 330, the forward link data rate again achieves its peak value of "R."

As is also shown in FIG. 4, as the mobile station 300 begins to move away from the base station 330 and toward the base station 320, the data rate again linearly decreases. The data rate reaches a low value of "R/2" at approximately midway between the base station 330 and the base station 320. In the situation where the base station 330 is a full featured base station, a data call associated with the mobile station 300 would be handed off from the base station 330 to the base station 320 at, or around this midway point. In the situation where the base station 330 is a wireless signal repeater and the data call is continuing to be served by the base station 310, the data call would instead be handed off from the base station 310 to the base station 320. It will be appreciated from FIGS. 3 and 4 that simply adding additional base station sites does not result in an improved overall data transmission rate for forward link communications because of the linear relationship of data rate to the relative location of a mobile station between neighboring base station sites.

3. IS-856 Data Rate Improvement with Controllable Repeater

In wireless communication systems as described herein (e.g., systems in accordance with IS-856), improved forward link data rates may be achieved by implementing controllable base station sites between "always on" neighboring base station sites. Such controllable base station sites include transceivers (e.g., for receiving and retransmitting wireless signals) that are activated and deactivated based on the location of a mobile station with respect to the base stations and the controllable base stations.

Figure 5:
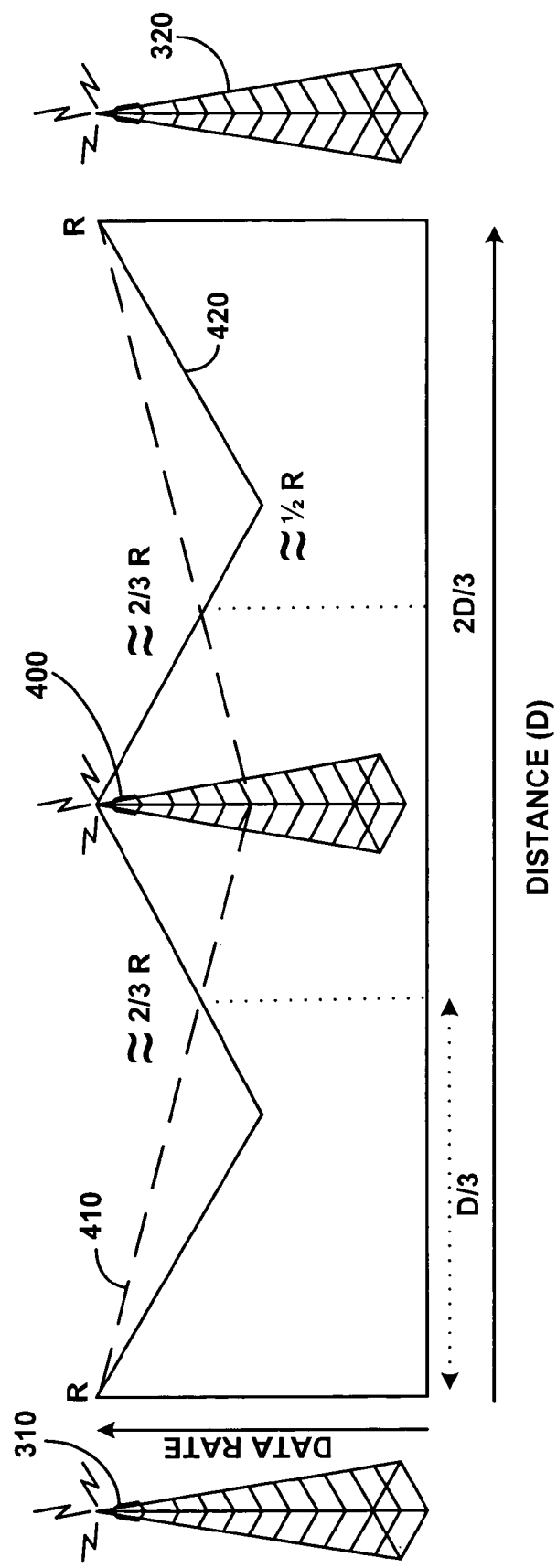
FIG. 5 is an overlay of FIGS. 3 and 4 illustrating where improved data rates are achieved using a controllable repeater.

FIG. 5 is a diagram that overlays FIGS. 3 and 4. This overlay demonstrates the benefits of having a controllable base station. The controllable base station site in FIG. 5 takes the form of a wireless signal repeater 400, where the repeater is located midway between adjacent base stations 310 and 320. The repeater 400, in an example system, is communicatively coupled with the base stations 310 and 320, such as through a backhaul T1 network that is used for network management purposes in such a wireless communication system. The repeater 400 is selectively enabled and disabled using messages communicated from the base stations 310, 320.

For instance, the base station 310 may communicate an activation/enable message to the repeater 400 when its transceivers are disabled. In response to receiving the enable message, the repeater 400 enables its transceivers and begins receiving and retransmitting forward link wireless signals from the base station 310 (and/or base station 320) to the mobile station 300 (not shown in this Figure). Likewise, a deactivation/disable message may be communicated from the base station 310 to the repeater 400. In response to receiving the disable message, the repeater 400 disables its transceivers and stops repeating wireless signals.

In FIG. 5, the line 410 illustrates the data rate for forward link communication with the mobile station 300 as a function of the mobile station 300's location when the repeater 400 is disabled (which is the same relationship as FIG. 3 where the repeater is not present). Further, the line 420 illustrates the data rate for forward link communication with the mobile station 300 as a function of the mobile station 300's location when the repeater 400 is enabled (which is the same relationship as illustrated and described with respect to FIG. 4 when a base station is present and operating).

As shown in FIG. 5, the lines 410, 420 intersect at four points. Two of the intersection points occur when the mobile station 300 is in close proximity with the base stations 310, 320, while the other two points occur when the mobile station is approximately one-third and two-thirds of the distance "D" between the base station 310 and the base station 320. It is at the intersection points at "D/3" and "2D/3" wherein enabling/disabling the transceivers of the repeater 400 will improve the data communication rate.

Generally, a method for improving forward link data rate in a wireless communication system in accordance with IS-856, such as illustrated in FIG. 5, includes determining a location of the mobile station 300 (e.g., when the mobile station 300 is engaged in a data call). Determination of the location of the mobile station may be accomplished using a global positioning system (GPS). For example, in a situation where a data call for the mobile station 300 is being served by the base station 310, the base station 310 may determine the mobile station 300's location in accordance with the Telecommunication Industry Association IS-801 standard, which relates to position determination messaging. IS-801 is incorporated by reference herein in its entirety.

Alternatively, the mobile station 300 may communicate its GPS location to the base station 310 via the DRC channel, as defined in the IS-856 standard and described above. Of course, other approaches could also be used to determine the location of the mobile station 300, such as triangulation techniques.

Once the location of the mobile station 300 is determined, the serving base station 310 then determines, based on the location of the mobile station 300, whether activating or deactivating the repeater 400 would increase a rate at which data is able to be communicated from the base station 310 to the mobile station 300. In the event that it is determined that activating the signal repeater 400 would increase the rate at which data is able to be communicated, the transceivers of the repeater 400 are activated, such as by sending an activation message from the base station 310 to the repeater 400. Likewise, in the event that it is determined that deactivating the signal repeater 400 would increase the rate at which data is able to be communicated, the transceivers of the repeater 400 are deactivated, such as by sending a deactivation message from the base station 310 to the repeater 400.

For instance, referring to FIG. 5, if the mobile station 300 is engaged in a data call that is being served by the base station 310 and the mobile station 300 is traveling from the area of base station 310 toward the area of base station 320, when the mobile station 300 reaches a location that is one-third the distance from the base station 310 to the base station 320 ("D/3"), the base station 310 may communicate an activation message to the repeater 400 in response to receiving location information regarding the mobile station 300's location (e.g., via IS-801 messaging or from the mobile station via the DRC channel). As shown in FIG. 5, the data rate at this location ("D/3") when the transceivers of the repeater 400 are enabled is substantially equivalent to the date rate when the transceivers of repeater 400 are disabled (as illustrated by the intersection of the lines 410, 420). However, as the mobile station 300 continues to move toward the repeater 400, the data rate when the transceivers of the repeater 400 are enabled increases (as illustrated by the line 420), while the data rate would decrease if the transceivers of the repeater 400 were not enabled, or the repeater 400 was not present.

The data rate at this intersection point (and the intersection point at the location corresponding with the distance "2D/3" from the base station 310) is approximately two-thirds of the peak data rate "R", or "2R/3." As is evident from FIG. 5, these intersection points ("D/3" and "2D/3") correspond with the low-points for data communication rates in systems implementing a controllable repeater, such as the repeater 400. The low data rates "2R/3") in such an embodiment represent a thirty-three percent increase over the low data rate ("R/2") of current systems.

As the mobile station 300 moves away from the area of the repeater 400 toward the base station 320, the data rate when the repeater 400 is enabled (the line 420) remains higher than the data rate when the repeater is off (the line 410) until the mobile station reaches a location that two-thirds the distance from the base station 310 to the base station 320 ("2D/3"). When the mobile station 300 reaches this location, a data call associated with the mobile station 300 that is being served by the base station 310 may be handed off to the base station 320 and the base station 310 (or the base station 320) would send a deactivation/disable message to the repeater 400. Responsively, the repeater 400 would disable its transceivers and stop retransmitting the wireless signals from the base station 310. The data rate (illustrated by the line 410) then increases to its peak value "R" as the mobile station 300 moves towards the area of the base station 320.

The distances (and corresponding locations) from the base station 310 (or any other base station) where enabling or disabling the repeater 400 would improve the data communication rate to the mobile station 300 may be included in the base station 310 (or any other appropriate network entity) as threshold values. In this situation, when the location of the mobile station 300 and the its corresponding distance from the base station 310 are determined, that distance may be compared with such thresholds to determine if activating or deactivating the wireless repeater would improve the forward link data rate. For instance, for the situation illustrated in FIG. 5, a first threshold may be set at one-third of the distance between the base station 310 and the base station 320 ("D/3") and a second threshold may be set at two-thirds the distance between the base station 310 and the base station 320 ("2D/3").

In this situation, for a data call being served by the base station 310, if it is determined that the mobile station 300 is a distance from the base station 310 that is less than "D/3", it would be determined that the transceivers of the repeater 400 should be disabled in order to achieve a higher data rate. If the transceivers of the repeater 400 are currently enabled, the base station 310 may send a disable message to the repeater 400 instructing it to disable its transceivers.

If it is determined that the mobile station 300, which has a data call being served by the base station 310, is a distance from the base station 310 (along a path toward the base station 320) that is between "D/3" and "2D/3", this would indicate that the transceivers of the repeater 400 should be enabled in order to achieve a higher data transmission rate. Assuming the transceivers of the repeater 400 are disabled, the base station 310 (or other entity) would communicate an enable message to the repeater 400, instructing the repeater 400 to enable its transceivers.

If it is determined that the mobile station 300, which has a data call being served by the base station 310, is a distance from the base station 310 (along a path toward the base station 320) that is greater than "2D/3", this would indicate that the transceivers of the repeater 400 should be disabled and the call handed off from the base station 310 to the base station 320 in order to achieve a higher data transmission rate. Assuming the transceivers of the repeater 400 are enabled, a soft handoff of the data call to the base station 320 would be executed. Once the soft handoff occurs, the base station 310 (or the base station 320, or other entity) would communicate a disable message to the repeater 400, instructing the repeater 400 to disable its transceivers.

It will be appreciated that the mobile station 300 may travel in the opposite direction and the roles of the base station 310 and 320 in the foregoing example would be reversed in such a situation. It will also be appreciated that other base stations may exist in a wireless communication system in which such methods are implemented and the principles discussed with respect to FIG. 5 may be applied to wireless communication systems containing any number of base stations and controllable repeaters, or the like.

For instance, implementing a method for improving data communication rates in a wireless communication system such as illustrated in FIG. 2 includes determining whether activating an inactive signal repeater or deactivating an active signal repeater would increase the rate at which data is able to be communicated. Such a method includes determining a distance between the mobile station 12 and a first base station of the plurality of base stations 38, 40, 42, where the first base station is currently serving data communication for the mobile station 12. The method then includes determining a distance between the mobile station 12 and at least a second base station of the plurality 38, 40, 42, such as the closet neighbor base station. The method further includes determining a distance between the mobile station and one or more repeaters (not shown in FIG. 2). Based on these distances, the base station serving the call (or other network entity) would determine whether activating an inactive signal repeater or deactivating an active signal repeater would increase the rate at which data is able to be communicated. This determination may be made by comparing the determined distances with threshold values, such as described above. Such a determination may also include executing a soft handoff of the data call from the first base station to another base station, as has been previously discussed.

4. Conclusion

While a number of aspects and embodiments have been discussed above, it will be appreciated that various modifications, permutations, additions and/or sub-combinations of these aspects and embodiments are possible. It is therefore intended that the following appended claims and claims here-after introduced are interpreted to include all such modifications, permutations, additions and/or sub-combinations as are within their true spirit and scope.

I claim:

1. In a wireless communication system comprising a plurality of base stations defining a plurality of wireless coverage areas in which a mobile station can engage in radio frequency (RF) communication with the base stations, a method comprising:
   determining a location of the mobile station;
   based on the determined location of the mobile station, determining whether activating an inactive signal repeater would increase a rate at which data is able to be communicated from the base stations to the mobile station, wherein the inactive signal repeater is disabled from transmitting wireless signals; and
   in the event that activating the signal repeater would increase the rate at which data is able to be communicated:
      activating the inactive signal repeater.

2. The method of claim 1, wherein activating the signal repeater comprises:
   communicating an activation message to the signal repeater from a base station of the plurality of base stations that is serving data communication for the mobile station; and
   responsive to the activation message, enabling transceivers of the signal repeater to receive and retransmit RF signals from the base station serving data communication for the mobile station.

3. The method of claim 1, wherein determining the location of the mobile station comprises using a global positioning system to determine the location of the mobile station.

4. The method of claim 1, wherein determining whether activating the inactive signal repeater would increase the rate at which data is able to be communicated comprises:
   determining a distance between the mobile station and a first base station of the plurality of base stations, wherein the first base station is currently serving data communication for the mobile station;
   determining a distance between the mobile station and a second base station of the plurality;
   determining a distance between the mobile station and the repeater; and
   determining whether activating the inactive signal repeater would increase the rate at which data is able to be communicated based on the distances of the mobile station to (i) the first base station, (ii) the second base station and (iii) the repeater.

5. The method of claim 4, wherein the distance between the mobile station and the first base station where activating the signal repeater would increase the rate at which data is able be communicated is (i) equal to or greater than one-third of a distance from the first base station to the second base station and (ii) equal to or less than two-thirds of the distance from the first base station to the second base station.

6. The method of claim 1, wherein determining that activating the inactive signal repeater would increase the rate at which data is able to be communicated comprises:
   determining a distance between the mobile station and a first base station of the plurality along a path from the first base station toward a second base station of the plurality, wherein the first base station is currently serving data communication for the mobile station; and
   determining that the distance between the mobile station and the first base station exceeds a threshold.

7. The method of claim 1, wherein data traffic is communicated from a serving base station of the plurality to the mobile station using time-division multiplexing at substantially full transmission power of the serving base station.

8. The method of claim 1, wherein determining that activating the inactive signal repeater would increase the rate at which data is able to be communicated comprises:
   determining a distance between the mobile station and a first base station of the plurality of base stations along a path from the first base station toward a second base station of the plurality, wherein the first base station is currently serving data communication for the mobile station; and
   determining that (i) the distance between the mobile station and the first base station exceeds a first threshold and (ii) the distance between the mobile station and the first base station is less than a second threshold,
   wherein the signal repeater is located approximately midway between the first base station and the second base station and is responsively activated based on the determination that the distance between the mobile station and the first base station (i) exceeds the first threshold and (ii) is less than the second threshold.

9. The method of claim 8, further comprising:
   determining that the mobile station has moved a distance along the path from the first base station toward the second base station that is greater than the second threshold;
   responsive to the determination that the mobile station has moved the distance greater than the second threshold:
      deactivating the signal repeater; and
      handing off a data call associated with the mobile station from the first base station to the second base station.

10. The method of claim 9, wherein the first threshold corresponds with a first distance that is approximately one-third of the distance between the first base station and the second base station and the second threshold corresponds with a second distance that is approximately two-thirds of the distance between the first base station and the second base station.

11. In a wireless communication system comprising a plurality of base stations defining a plurality of wireless coverage areas in which a mobile station can engage in radio frequency (RF) communication with the base stations, a method comprising:
   determining a location of the mobile station;
   based on the determined location of the mobile station, determining whether deactivating an active signal repeater would increase a rate at which data is able to be communicated from the base stations to the mobile station; and
   in the event that deactivating the signal repeater would increase the rate:
      deactivating the signal repeater so that the signal repeater is disabled from transmitting wireless signals.

12. The method of claim 11, wherein determining that deactivating the active signal repeater would increase the rate at which data is able to be communicated comprises:
   determining that the mobile station is within a threshold distance of a first base station of the plurality, wherein the first base station is currently serving data communication for the mobile station.

13. The method of claim 11, wherein determining that deactivating the active signal repeater would increase the rate at which data is able to be communicated comprises:
   determining that the mobile station is greater than a threshold distance from a first base station of the plurality, wherein the first base station is currently serving data communication for the mobile stations, and
   responsive to the determination that the mobile station is greater than the threshold distance from the first base station, the method further comprises handing off a data call associated with the mobile station from the first base station to a second base station.

14. The method of claim 11, wherein deactivating the signal repeater comprises:
communicating a deactivation message to the signal repeater from a base station of the plurality of base stations that is serving data communication for the mobile station; and
responsive to the deactivation message, disabling transceivers of the signal repeater that are used to receive and retransmit RF signals from the base station that is serving data communication for the mobile station.

15. The method of claim 11, wherein determining whether deactivating the active signal repeater would increase the rate at which data is able to be communicated comprises:
determining a distance between the mobile station and a first base station of the plurality of base stations, wherein the first base station is currently serving data communication for the mobile station;
determining a distance between the mobile station and a second base station of the plurality;
determining a distance between the mobile station and the repeater;
determining whether deactivating the active signal repeater would increase the rate at which data is able to be communicated based on the distances of the mobile station to (i) the first base station, (ii) the second base station and (iii) the repeater.

16. The method of claim 11, wherein determining that deactivating the active signal repeater would increase the rate at which data is able to be communicated comprises:
determining a distance between the mobile station and a first base station of the plurality along a path from the first base station toward a second base station of the plurality, wherein the first base station is serving data communication for the mobile station and the signal repeater is located approximately midway between the first base station and the second base station along the path; and
determining that (i) the distance between the mobile station and the first base station is less than a first threshold or (ii) the distance between the mobile station and the first base station exceeds a second threshold,
wherein in the event the distance between the mobile station and the first base station exceeds the second threshold, the method further comprises handing off a data call associated with the mobile station from the first base station to the second base station.

17. A wireless communication system for providing communication services to a mobile station, the system comprising:
a first base station and a second base station for providing wireless data communication to the mobile station, the first base station initially serving a data call for the mobile station; and
a signal repeater that is controllable by the first base station, the signal repeater being initially disabled,
wherein the system contains service logic that, when executed, collectively provides for:
determining a location of the mobile station;
based on the determined location of the mobile station, determining whether activating the signal repeater would increase a rate at which data is able to be communicated from the first base station to the mobile station, wherein the inactive signal repeater is disabled from transmitting wireless signals; and
in the event that activating the signal repeater would increase the rate at which data is able to be communicated:
activating the inactive signal repeater.

18. The system of claim 17, wherein the service logic provides for activating the signal repeater by:
communicating an activation message from the first base station to the signal repeater; and
responsive to the activation message, enabling transceivers of the signal repeater to receive and retransmit RF signals from the first base station.

19. The system of claim 17, wherein the service logic provides for determining whether activating the signal repeater would increase the rate at which data is able to be communicated by:
determining a distance between the mobile station and the first base station;
determining a distance between the mobile station and the second base station;
determining a distance between the mobile station and the repeater; and
determining whether activating the signal repeater would increase the rate at which data is able to be communicated based on the distances of the mobile station to (i) the first base station, (ii) the second base station and (iii) the repeater.

20. A wireless communication system for providing communication services to a mobile station, the system comprising:
a mobile station;
a first base station and a second base station for providing wireless data communication to the mobile station, the first base station initially serving a data call for the mobile station; and
a signal repeater that is controllable by the first base station, the signal repeater being initially enabled,
wherein the system contains service logic that, when executed, collectively provides for:
determining a location of the mobile station;
based on the determined location of the mobile station, determining whether deactivating the signal repeater would increase a rate at which data is able to be communicated from the first base station to the mobile station; and
in the event that deactivating the signal repeater would increase the rate:
deactivating the signal repeater so that the signal repeater is disabled from transmitting wireless signals.

21. The system of claim 20, wherein the service logic provides for determining that deactivating the active signal repeater would increase the rate at which data is able to be communicated by:
determining a distance between the mobile station and the first base station along a path from the first base station toward the second base station, wherein the signal repeater is located approximately midway between the first base station and the second base station along the path;
determining that (i) the distance between the mobile station and the first base station is less than a first threshold or (ii) the distance between the mobile station and the first base station exceeds a second threshold,
wherein in the event the distance between the mobile station and the first base station exceeds the second threshold, the method further comprises handing off a data call associated with the mobile station from the first base station to the second base station.

* * * * *